July 22, 1952  J. D. RIESER  2,603,983
SELF-ALIGNING UNIMOUNT DRIVE
Filed March 30, 1951  4 Sheets-Sheet 1

INVENTOR.
John D. Rieser
BY
John D. Rieser

July 22, 1952      J. D. RIESER      2,603,983

SELF-ALIGNING UNIMOUNT DRIVE

Filed March 30, 1951      4 Sheets-Sheet 2

INVENTOR.
John D. Rieser
BY John W. Rieser

July 22, 1952          J. D. RIESER          2,603,983
SELF-ALIGNING UNIMOUNT DRIVE
Filed March 30, 1951          4 Sheets-Sheet 4
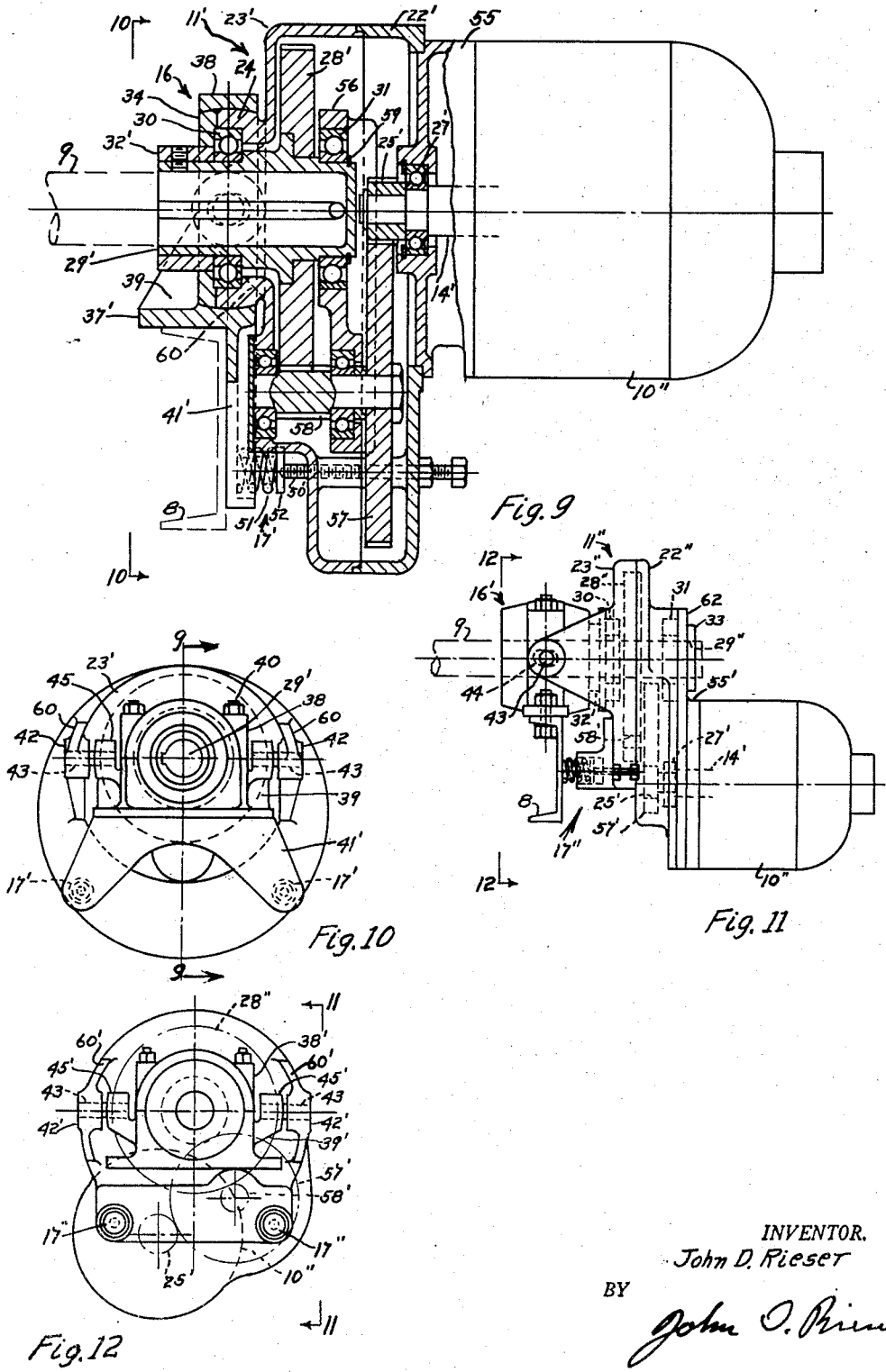
INVENTOR.
John D. Rieser
BY Patented July 22, 1952

2,603,983

UNITED STATES PATENT OFFICE 2,603,983

SELF-ALIGNING UNIMOUNT DRIVE

John D. Rieser, San Francisco, Calif.

Application March 30, 1951, Serial No. 218,451

12 Claims. (Cl. 74—640)

1

This invention relates to a self-aligning unimount drive of the kind involving an electric motor as the prime mover and a speed change transmission mechanism coupled with and supported about a portion of a driven drive shaft of the driven machinery.

This application relates generally to the type of drive gearmotor speed change units shown in my copending application Serial Number 760,044, filed July 10, 1947.

One object of the present invention is to provide spherical mounting means around the power takeoff shaft of the geared speed change device, so as to effect support for the unimount drive unit directly about the common longitudinal axis of the driven drive shaft and the power takeoff shaft of the unimount drive gearmotor speed change transmission.

Another object of the present invention is to provide adjustable mounting means automatically adjustable both in angular and in parallel direction and disposed to support the drive unit directly about the common longitudinal axis of the driven drive shaft and the power takeoff of the geared speed change device of the unitary drive gearmotor speed change transmission unit.

Another object of the present invention is to provide self adjustable mounting means, disposed to support the drive unit directly about the common longitudinal axis of the driven drive shaft and the power takeoff of a geared speed change device of a drive gearmotor speed change transmission, in combination with a counterpoise or reactance device so constructed as to develop a reactance force and compensate for situation of the overhung weight portions of the drive unit projecting beyond the mounting means.

Another object of the present invention is to provide torque resisting means which is so constructed as to effect maintenance of the drive unit in a relatively stationary angular position.

Other more specific objects and advantages will appear from the following description of the illustrative embodiment of the present invention.

In the drawings accompanying and forming a part hereof, Figure 1 is a side view of my unit, partly in section, taken on the line 1—1, Figure 2.

Figure 9 is a side view of a modified embodiment of my invention, partly in section, taken on the line 9—9 of Figure 10.

Figure 10 is a power takeoff end view in the direction of the arrows on line 10—10 of Figure 9 indicating dual counterpoise means.

Figure 11 is a side view of another modified form of my invention showing the motor disposed to one side of the center of the power takeoff shaft.

Figure 12 is a power takeoff end view in the direction of the arrows of line 12—12 of Figure 11, omitting the channel.

Figure 1:
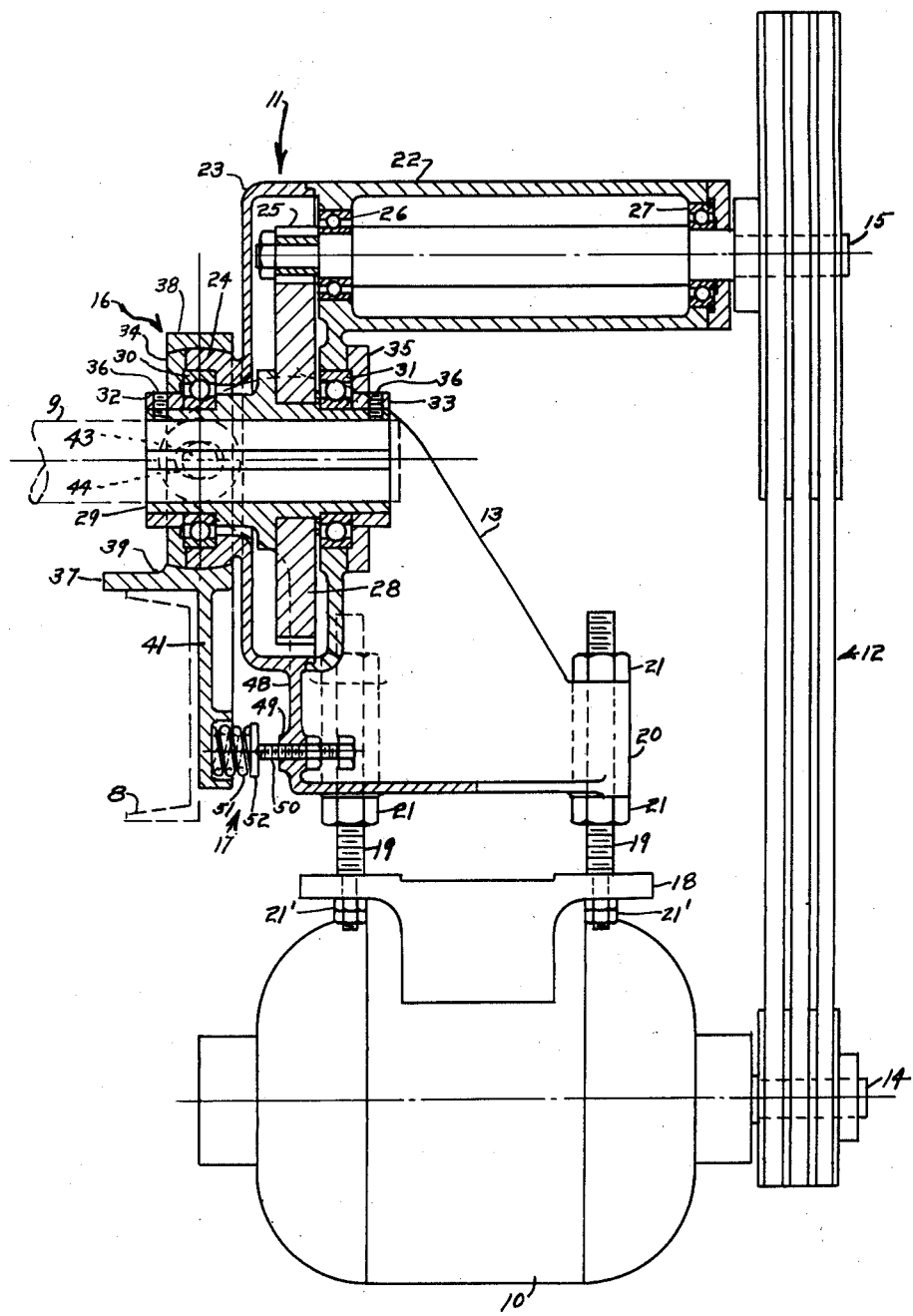

In conformity with the objects of this invention, to provide a unitary drive gearmotor speed change power transmission unit, hereinafter referred to as unimount drive unit, and referring particularly to Figure 1, the unimount drive unit generally includes a speed change device 11, a power input shaft 15, a power takeoff shaft 29 which in this illustration is tubular, a universal selfadjustable mounting means 16, adjustable concentrically about the axis of the power takeoff shaft 29, a drive motor 10, a primary drive 12 affording drive connection between the drive motor 10 and the speed change device 11, and the unitary mounting means 12. The drive unit is mounted about a driven shaft 9, of a driven machinery. The shaft 9 is indicated by dot and dash lines.

In the forms shown in Figures 1, 3, 6, 7 and 8 the speed change device 11 is a single reduction gear unit, which supports the universal selfadjustable mounting means 16 and the unitary mounting means 13 on which latter the drive motor 10 is supported. The primary drive 12 shown is an ordinary multi-V-belt reduction drive between the output shaft 14 of the drive motor 10 and the input shaft 15 of the speed change device 11, but any other type primary drive device can be utilized, such as chain or gear drive or other device. In the form shown, the distance between the output shaft 14 and the input shaft 15 is adjustable to accommodate desired ratio of the primary drive 12 and for belt take-up adjustment. In the form of these figures the drive angle may be considered as vertical. In the drive arrangement shown in Figures 1, 3, 6, 7, 8 and 9 the channel member 8 along with the driven shaft 9 is considered as a part of the driven machinery, and in each of these examples the power takeoff shaft 29 or 29' is indicated as mounted about an end portion of driven shaft 9. The pad portion 37 or 37' of the universal self-adjustable mounting means 16 located at an end portion of the speed change device 11 or 11'' is shown mounted onto the channel member 8, while the major weight of the drive unit projects beyond the universal self-adjustable mounting means 16. This projected weight situation is compensated for by the counterpoise means (hereinafter described) indicated generally by the numeral 17 or 17' for obviating undue stress on the driven shaft 9 an end of which latter is supported by my drive unit. It is readily understood that the channel member 8, serves as a substantial foundation for the support of the drive unit and that this foundation may be of any other shape or structure, and the pad portion 37 may change accordingly.

The drive motor 10 has feet 18 and has the power output shaft extension 14, and may be of usual construction, therefore its detail structure is not here described. The drive motor feet 18 have holes for the ends of four studs 19. The studs 19 are of simple construction. The body portion of each stud 19 is threaded for the nut 21 and an end of each stud is turned to size to fit the hole in the motor feet 18 and is threaded for the nut 21'. The unity mounting means 13 are arranged in a pair, and each has two bosses 20 that are bored to allow the body portions of the studs 19 to pass therethrough. The nuts 21 bear upon the ends of the bosses 20 to secure a desired space between the drive motor shaft 14 and the speed change device input shaft 15. In order to effect a change in the distance between the motor shaft 14 and the speed change device input shaft 15, one set of nuts 21 are turned in one direction and opposite set are rotated in desired direction to effect desired change. The drive motor 10 is secured to the ends of the studs 19 by the nuts 21'.

Figure 2:
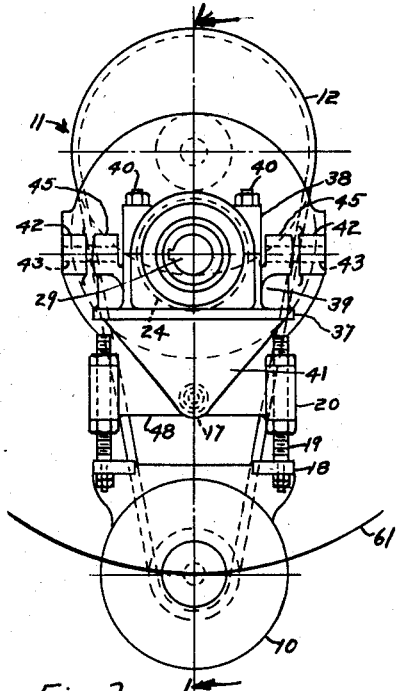
Figure 2 is a power takeoff end view, viewing in the direction of lines 2—2 of Figure 3.

Referring to Figure 1, the change speed device 11 in this illustration includes a gear housing that is formed of two parts so as to form an oil tight enclosure for the desired gearing. One of the parts of this gear housing is the cover section 22, the second part is a body section 23. They are suitably fitted and fastened together to form a single unit. The fastenings are not shown. The body section 23 has a support element 24, which forms the internal portion of the universal self-adjustable mounting means 16. A portion of the power input shaft 15 within the gear housing is provided with a pinion gear 25 affixed thereto. This power input shaft is suitably journalled in the bearings 26 and 27. The bearing 27 and the input shaft 15 are anchored in suitable manner to avert endwise movement. In mesh with the pinion gear 25 is a power takeoff gear 28 mounted and affixed onto the power takeoff shaft 29. The power takeoff shaft is suitably journalled in bearings 30 and 31 and these two bearings are anchored to the power takeoff shaft against endwise movement by shoulders of the takeoff shaft 29 and collars 32 and 33. The bearing 30 is anchored within the support element 24 by the closure plate 34, and the bearing 31 is enclosed within the gear housing by the other closure plate 35, and these two closure plates are fastened in regular manner to form housing unity. The fastenings are not shown. The power takeoff shaft 29 is bored to receive the driven shaft 9, or a bushing where the driven shaft is of smaller size. The collars 32 and 33 are bored to fit over the end portions of the power takeoff shaft and are provided with setscrews 36 that extend through the wall of the power takeoff shaft. These setscrews may be utilized to locate the unimount drive unit onto the driven shaft. Figures 2, 9 and 10 show keyway inside of the power takeoff shaft to receive suitable drive key.

Referring to Figures 1 and 2, the housing of the universal self-adjustable mounting means 16 is formed by a cap 38 and a body 39, joined at the center line similarly to that of an ordinary split type bearing and bolted together as a unit by the studs 40. The inside of this housing is bored spherical to correspond with the outside diameter of the support element 24 and closure plate 34, which are turned spherical concentrically to the bore of the power takeoff shaft 29. These spherical surfaces form a universal support seat for the overhung unitary drive structure.

Figure 3:
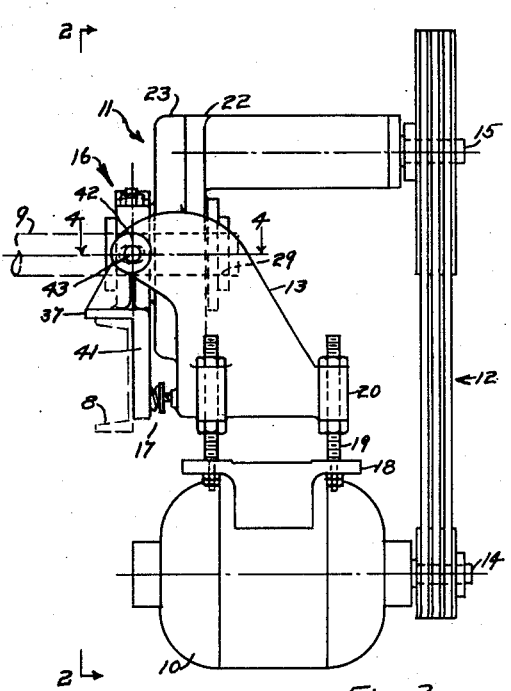
Figure 3 is a side view of Figure 2 and indicating the unit mounted onto a channel member, with the driven shaft in place.
Figure 4:
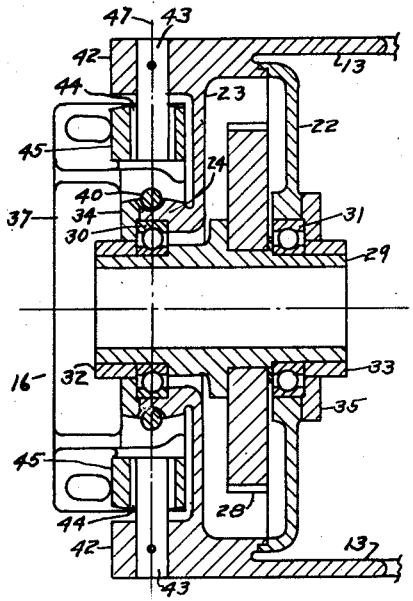
Figure 4 is a sectional plan view, the section being taken on the line 4—4 of Figure 3, showing the universal adjustable mounting means in angular alignment with the axis of the power takeoff shaft.

The pad portion 37 is, in this example, a part of the body 39 similarly to that of an ordinary bearing. A counterpoise foundation 41 extends from and perpendicularly to the pad portion 37. The pair of unity mounting means 13 are arranged one on each side of and as a part of the body section 23 of the gear housing, as shown in Figures 3 and 4. Their upper ends extend at each side of the universal self-adjustable mounting means 16 and each of these ends has a boss 42, each of which latter is bored to receive a pin 43. Each pin 43 is secured within its boss 42 and extends into a slotted hole 44 in a boss 45, one on each side of the body 39.

These pins 43 together with their bosses 42 and 45, allow for different angles of the primary drive in that the motor 10 may be positioned anywhere on the arc of a circle 61, which is scribed from the center of the power take-off shaft, as shown in Figure 2, without interfering with the self-adjustable feature compensating for parallel or angular misalignment situations. These pins and their bosses also form torque elements to compensate for any unbalanced drive torque situation.

Figure 5:
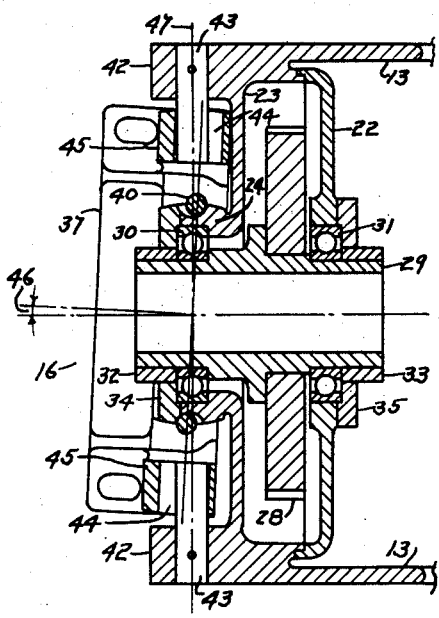
Figure 5 is a sectional plan view similar to that of the Figure 4, but showing a situation of angular misalignment between the universal adjustable mounting means and axis of the power takeoff shaft.

In the example of alignment situations shown in Figure 4, the pad portion 37 is in angular alignment with the longitudinal axis of the power takeoff shaft 29 which is also the longitudinal axis of the driven shaft 9. In Figure 5, this same pad portion 37 shows a situation of angular misalignment by the amount designated by the numeral 46. In Figure 4 the center line 47 of the spherical portion of the universal self-adjustable mounting means 16 is at right angle to the axis of the power takeoff shaft and in this instance, also coincides with the center line of the pins 43 and the mid center of the slotted holes 44. In Figure 5 the relation of this same center line 47 with respect to the axis of the power takeoff shaft is unchanged by movement of the housing of the universal self-adjustable mounting means about the spherical portion of the support element 24, however the mid-center of the slotted holes 44 shifts with the housing, which does not interfere with the purpose of the pins 43 heretofore mentioned. A portion of the holes for each stud 40 is enlarged at the spherical portion of the support element 24, and is made of such shape as to form limits of the permissible range of movement of the studs and of the housing.

For parallel alignment situations, referring to Figure 1, the channel member 8 upon which the pad portion 37 anchors is shown in parallel alignment to the longitudinal axis of the power takeoff and driven shafts. For an example of parallel misalignment situation refer to the Figure 6, wherein channel member 8 is shown in misalignment to that of the axis of the power takeoff and driven shafts by the amount represented by angle 46'. In this example of the application of the unitary drive unit, the longitudinal axis of the driven shaft may be considered as horizontal, but the support face of the channel member 8 is not parallel to the axis of the driven shaft or of the power takeoff shaft which latter rigidly connects to the end portion of the driven shaft. Thus upon seating of the pad portion 37 onto the top face of the channel member 8, the housing portion of the universal self-adjustable mounting means shifts about the spherical portion of the support element 24. As the axes of the power takeoff and driven shafts at the center of movement are coaxial, movement to accommodate angular or parallel misalignment situations or combination of both, does not interfere with the purpose of the pins 43 or the universal self-adjustability of the self-adjustable mounting means.

For counterpoise means 17, referring to Figures 1 and 2, a rib 48, shown as a portion of the body section 23, extends between the pair of unity mounting means 13. A boss 49 on the rib 48 is threaded for a setscrew 50. A washer 52 on the end of the setscrew 50 bears upon a compression spring 51, which latter in turn bears upon the counterpoise foundation 41. In the event the counterpoise foundation is omitted, the end of the compression springs could bear upon a face of the driven machinery, for example, on the web of the channel member 8. The counterpoise means 17 is utilized to compensate for the overhung weight situation of that portion of the unimount drive unit which projects beyond the universal self-adjustable mounting means 16. The self-adjustable feature and adjustment of the setscrew 50 in a direction to compress the compression spring 51 provides thrust force to counteract the tendency of the overhung weight of the drive unit to tilt about the universal self-adjustable mounting means. The structural section of the counterpoise foundation is made sufficiently strong to support the thrust of the compression spring 51. Misalignment situations do not materially interfere with the counterpoise means 17.

Figure 7:
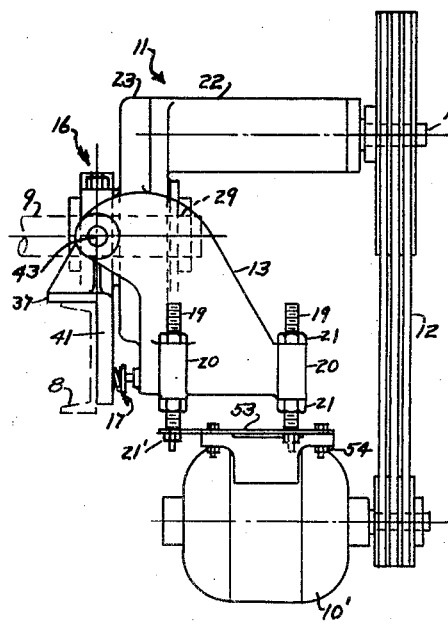
Figure 7 is a side view similar to that of the Figure 3, with exception of the motor, which in this instance is of different size and the figure shows the method of applying a different size motor onto a given size unit.
Figure 6:
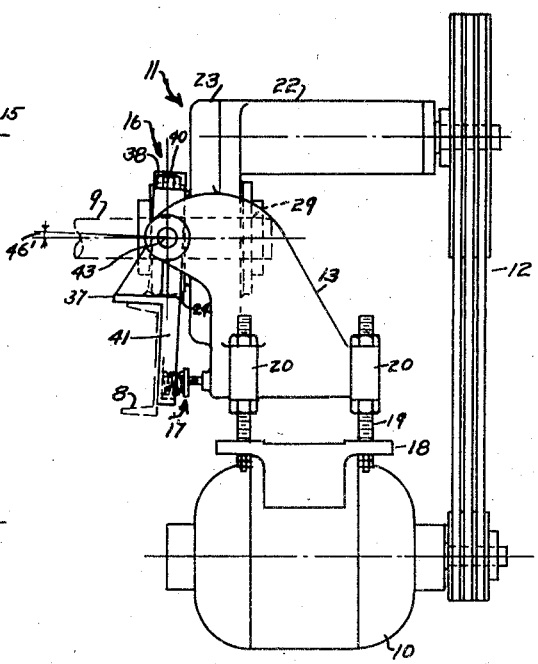
Figure 6 is a side view similar to that of Figure 3, but showing a situation of parallel misalignment between the universal adjustable mounting means and the axis of the power takeoff and driven shafts.

In the art of gearmotor units, problems concerning power factor situations are well known, therefore are not here described. Figure 7 illustrates an economical method whereby a given size unit may employ an entirely different power size drive motor and provide a required power factor situation without materially upsetting the unity drive driven unit. The drive motor 10' in Figure 7 is of smaller size than that shown in the Figure 3. This drive motor 10' is secured to an adaptor member 53 by four bolts 54, and the adaptor member 53 is supported and secured to the unity mounting means 13 by the four studs 19 in identical manner as that heretofore described concerning the support of the drive motor 10 in Figures 1, 3, 6, 7 and 8, without changing the various features hereinabove described. The adaptor member 53 may be of simple rectangular plate with two sets of bolt holes, one set to match the feet of the drive motor 10' and other set to conform to the spacings of the four bosses 20.

Figure 9, shows a modified form of the drive unit. In this form the entire change of speeds between the drive motor 10'' and the power takeoff shaft 29' is effected through gearing and thus provide a positive drive. The drive motor 10'' is an ordinary standard round frame motor without feet, rear end bracket or rear bearing, therefore its detail structure is not here described. The drive motor 10'' mounts onto an ordinary adaptor ring 55, which in turn mounts onto the cover section 22' of the gear housing in similar manner to that of usual gearmotor practice, therefore the fastenings are not shown. The speed change device generally indicated by the numeral 11'' includes a gear housing that is formed of two parts and they form together an oil tight enclosure for a desired gearing. One of the parts of this gear housing is the cover section 22' the second part is the body section 23'. Within the gear housing is a fixed spider 56 to support the inner bearings. The cover section and the body section together with the spider are fitted and fastened together in suitable manner, not shown, to form a single unit.

The body section 23' has extended therefrom the support element 24, which forms the internal portion of the universal self-adjustable mounting means 16, as heretofore described. An end portion of the drive motor shaft 14' is journalled in the bearing 27' in the adaptor ring 55. On the end of the motor shaft 14' is mounted a pinion gear 25' which is in mesh with an intermediate gear 57. The other end of the drive motor shaft 14' is journalled in a suitable motor bearing, not shown, located within the front bracket of the drive motor 10''. The intermediate gear 57 is mounted and affixed onto a shaft extension of an intermediate pinion gear 58, which latter is suitably journalled within the gear housing. In mesh with the intermediate pinion gear 58 is the power takeoff gear 28'. The power takeoff gear 28' is mounted and affixed onto the power takeoff shaft 29', and the power takeoff shaft is suitably journalled in the bearings 30 and 31. These two bearings are anchored to the power takeoff shaft against endwise movement by shoulders of the takeoff shaft and collar 32' and on the outer end a snap ring 59 on the inner end of the shaft 29'. The bearing 30 is anchored within the support element 24 by the closure plate 34 and this closure plate is suitably fastened to the support element.

The power takeoff shaft 29' is bored to receive the driven shaft 9 as heretofore described. In this example, the end of the power takeoff shaft within the gear housing is closed to form oil tight closure. Should it be required to extend this power takeoff shaft through the gear housing in similar manner to that shown in Figure 1, the design can readily be modified to place the drive motor to one side of or below the power takeoff shaft. The universal self-adjustable mounting means 16, of this modified form of the drive unit, is same as that heretofore described with the exceptions that each of the bosses 42 are joined to the body section 23' by the ribs 60, as shown in Figure 10, and that the counterpoise foundation 41' is extended to match spacing of the dual or forked counterpoise means 17'. The detail parts and function of each of the two counterpoise means included in this form of the drive unit, are similar to that heretofore described, with the exception that in this instance each of the adjusting screws 50' pass through a portion of the gear housing, the body section 23" being threaded to receive the adjusting screw threads, while at the cover section 22' these adjusting screws afford locknuts to secure an adjustment. These adjusting screws may also serve to clamp together parts of the gear housing.

Figures 11 and 12 show a modification of the positive drive arrangement to allow for the power takeoff shaft 29" to extend through the gear housing. The drive motor 10" is similar to that shown in Figure 9 and mounts onto an ordinary adaptor ring 55' which in turn includes the closure flange 62 which latter in turn mounts onto the cover section 22", the fastenings are not shown. The speed change device generally indicated by the numeral 11", includes a gear housing formed of a cover section 22" and a body section 23" suitably fitted and fastened together in regular manner to form a single oil tight unit. An end portion of the drive motor shaft 14' is journalled in the bearing 27' which is supported within the adaptor ring 55'. On the end of the motor shaft 14' is mounted the pinion gear 25' which is in mesh with the intermediate gear 57'. The other end of the drive motor shaft 14' is journalled in a suitable motor bearing, not shown, located within the front bracket of the motor 10". The intermediate gear 57' is mounted and affixed onto the shaft extension of the intermediate pinion gear 58' which latter is suitably journalled within the gear housing. In mesh with the intermediate pinion gear 58' is the power takeoff gear 28". The power takeoff gear 28" is mounted and affixed onto the power takeoff shaft 29" as heretofore described. The power takeoff shaft is suitably journalled in the bearings 30 and 31 and these two bearings are anchored to the power takeoff shaft against endwise movement as heretofore described. The power takeoff shaft 29" is bored to receive the driven shaft 9, and extends through the gear housing in similar manner to that shown and described in the Figure 1. In Figure 12 the pitch circle of each gear within the gear housing is shown by dash and dot circles, to show required spacings to allow for the power takeoff shaft extending through both ends of the gear housing.

In the form of Figures 11 and 12, the mounting means generally indicated by the numeral 16', includes a self-aligning bearing the cap portion 38' and the body portion 39' of which have bosses 45' with slotted holes 44 therein to receive the pins 43. These bosses 45' are shown as an integral portion of the body 39'. The bosses 42' for the pins 43 are joined to the body section 23" by the ribs 60' similar to that heretofore described. The details of the self-aligning bearing, not shown, may be of the type generally known as ball and socket type bearings or they may be of the self-aligning type bearing with proper adaptation for said pins and slotted holes. The detail parts and function of the counterpoise or reaction means generally indicated by the numeral 17" are similar to those heretofore described, with the exception that in this instance, the counterpoise foundation is the channel of the driven machinery.

Figure 8:
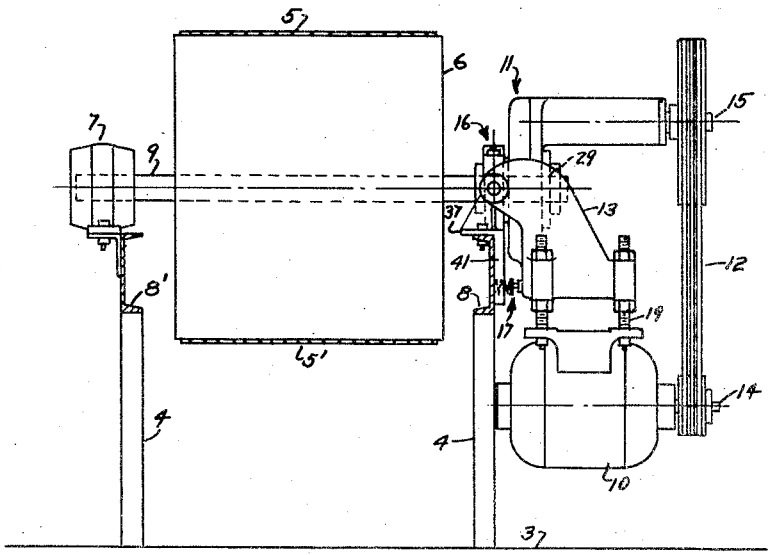
Figure 8 is a section through a typical conveyor structure at the drive end to show an application of my drive gearmotor transmission unit onto a driven machine.

To illustrate the practicable utility and ease of application of the invention hereinabove described, as the drive for the machinery being driven, I show in Figure 8 the selected machinery to be driven as a belt conveyor. Figure 8 is a cross section taken at the drive portion of an ordinary belt conveyor and shows installation of the drive unit, coupled directly on an end portion of the driven shaft. The drive unit is supported on the conveyor stringer channel member 8. In Figure 8 the carrying side 5 of the endless conveyor belt extends about the perimeter portion of the pulley 6 to provide the usual arc of drive contact up to the return side 5 of the conveyor belt. The support structures 4 support the conveyor stringers or channel members 8 and 8', on the walkway or floor 3'. The pulley 6 is affixed onto the driven shaft 9 one end portion of which latter is journalled in the bearing 7 affixed onto the conveyor stringer in suitable manner. The other end portion of the driven shaft 9, is secured in the power takeoff shaft 29, of the unimount drive unit as heretofore described. The pad portion 37 of the universal self-adjustable mounting means 16 is suitably affixed onto the conveyor stringer channel member 8 and mounts together the entire drive unit and the end of the driven shaft of the machinery being driven.

Thus it is apparent that the unimount drive unit of this invention, affords complete self-contained speed change power transmission drive units that materially simplify installation problems of speed change transmission drives with consequent reduction of overall installed costs. Its installation features are practicable, simple and of most economical form, its power takeoff mounts directly onto the driven shaft requiring no more skill and labor than the installation of an ordinary bearing or hub. It connects a driver element directly onto a driven shaft which is the most desirable and most economical practical drive connection. This invention eliminates the need for finished supporting surfaces, because such surfaces need not be in alignment with the axis of the driven shaft to which the device fastening holes. Its universal self-adjustable mounting means affords self-aligning mounting features wherein the support surface requires no particular preparation other than simple fastening holes. Its universal self-adjustable mounting means affords self-aligning journal support for the end portion of the driven shaft to which the device couples directly and thereby effects additional cost saving of at least the cost of one self-contained heavy duty bearing. Its unity is complete including the drive motor and the coaxial flexible mounting features about the axis of the driven shaft, to the extent that overhung weight situations and drive forces may be compensated for in a manner that avoids their inducing undue stresses onto the driven shaft of the driven machinery, which in turn allows for less heavy section of the drive elements of the driven machinery than would be required to support overhung weight situation or overhung drive stresses as ordinarily encountered in other types of drive apparatus. This accomplishes further cost saving in speed change power transmission drive problems. Added savings are effected in favorable power transmission drive problems, in that the power takeoff shaft of this drive unit could extend therefrom in the form of internal driven shaft without sacrificing any of the advantages described.

Various changes may be made in the embodiment of the invention hereinabove specifically described without departing from or sacrificing the advantages of the invention as defined in the appended claims.

I claim:

1. A speed change transmission comprising, a driven shaft, a journal support for said driven shaft, a prime mover and a speed change device operably coupled to form a speed change unit, said speed change device having a power takeoff including means to couple it rigidly about a portion of said driven shaft, a universal support for said speed change unit including, a support element, a spherical portion on said support element, a base member adapted to be secured to a foundation and adjustably engaging said spherical portion for supporting said support element, said spherical portion being coaxial with the longitudinal axis of said power takeoff, and said rigidly coupled driven shaft being journalled in said support element for supporting said speed change unit so as to permit said universal support to position said speed change unit to compensate for parallel and angular mounting misalignment between said longitudinal axis and said base member.

2. A speed change transmission comprising, a driven shaft, a journal support for said driven shaft, a prime mover and a speed change device operably coupled to form a speed change unit, said speed change device having a power takeoff including coupling means to connect it rigidly about a portion of said driven shaft, a universal support for said speed change unit including, a support element, a spherical portion on said support element, a base member adapted to be secured to a foundation and adjustably engaging said spherical portion for supporting said support element, said spherical portion being coaxial with the longitudinal axis of said power takeoff, and said rigidly coupled driven shaft being journalled in said support element for supporting said speed change unit so as to provide for said universal support to position said speed change unit to compensate for parallel and angular mounting misalignment between said longitudinal axis and said base member, connecting means extending from said speed change unit toward said base member and tiltable torque resisting pivot connection between said connecting means and said base member, the pivotal and tilting axes of said connection intersecting the center of said spherical portion so as to permit said speed change unit to compensate for said misalignment and to substantially resist angular movement of said speed change unit with and relatively to said rigidly coupled driven shaft.

3. A speed change transmission comprising, a driven shaft, a journal support for said driven shaft, a prime mover and a speed change device operably coupled to form a speed change unit, said speed change device having a power takeoff shaft, bearing support in said speed change device for said power takeoff shaft, coupling means to connect said power takeoff shaft rigidly about a portion of said driven shaft, a universal self-aligning support for said speed change unit including, a support element, said support element extending from said speed change unit, a spherical portion on said support element, a base member adapted to be secured to a foundation and adjustably engaging said spherical portion for supporting said support element, said spherical portion being coaxial with the longitudinal axis of said power takeoff shaft, and said rigidly coupled driven shaft being journalled by said bearing support in said speed change device to provide said journal support.

4. A speed change transmission comprising, a driven shaft, a journal support for said driven shaft, a prime mover and a speed change device operably coupled to form a speed change unit, said speed change device having a power takeoff shaft, bearing support in said speed change device for said power takeoff shaft, coupling means to connect said power takeoff shaft rigidly about a portion of said driven shaft, a universal self-aligning support for said speed change unit including, a support element, said support element extending from said speed change unit, a spherical portion on said support element, a base member adapted to be secured to a foundation and adjustably engaging said spherical portion for supporting said support element, said spherical portion being coaxial with the longitudinal axis of said power takeoff shaft so as to permit said universal self-aligning support to position said speed change unit to compensate for parallel and angular mounting misalignment between said longitudinal axis and said base member, and said rigidly coupled driven shaft being journalled by said bearing support in said speed change device to provide said journal support.

5. A speed change transmission comprising, a driven shaft, a journal support for said driven shaft, a prime mover and a speed change device operably coupled to form a speed change unit, said speed change device having a power takeoff shaft, bearing support in said speed change device for said power takeoff shaft, coupling means to connect said power takeoff shaft rigidly about a portion of said driven shaft, a universal self-aligning support for said speed change unit including, a support element, said support element extending from said speed change unit, a spherical portion on said support element, a base member adapted to be secured to a foundation and adjustably engaging said spherical portion for supporting said support element, said spherical portion being coaxial with the longitudinal axis of said power takeoff shaft, connecting means extending from said speed change unit toward said base member and tiltable torque resisting pivot connection between said connecting means and said base member, the pivotal and tilting axes of said connection intersecting the center of said spherical portion so as to permit said rigidly coupled driven shaft being journalled by said bearing support in the speed change device to provide said journal support and to substantially resist angular movement of said speed change unit with and relatively to said rigidly coupled driven shaft.

6. A speed change transmission comprising, a driven shaft, a journal support for said driven shaft, a prime mover and a speed change device operably coupled to form a speed change unit, said speed change device having a power takeoff shaft, bearing support in said speed change device for said power takeoff shaft, coupling means to connect said power takeoff shaft rigidly about a portion of said driven shaft, a universal self-aligning support for said speed change unit including, a support element, said support element extended from said speed change unit, a spherical portion on said support element, a base member adapted to be secured to a foundation and adjustably engaging said spherical portion for supporting said support element, said spherical portion being coaxial with the longitudinal axis of said power takeoff shaft, so as to provide for said universal self-aligning support to position said speed change unit to compensate for parallel and angular mounting misalignment between said longitudinal axis and said base member, said rigidly coupled driven shaft being journalled by said bearing support in said speed change device and provide said journal support, and connecting means extending from said speed change unit toward said base member and tiltable torque resisting pivot connection between said connecting means and said base member, the pivotal and tilting axes of said connection intersecting the center of said spherical portion so as to permit said speed change unit to compensate for said misalignment and to substantially resist angular movement of said speed change unit with and relatively to said rigidly coupled driven shaft.

7. A speed change transmission and prime mover unit comprising a housing, a prime mover connected to the housing so as to be supported therewith, a mounting support adapted to be fixedly mounted on a surface of a driven machinery, a transmission in the housing, a driving connection between said prime mover and said transmission, a power takeoff element journalled in the housing, a self-aligning connection between said power takeoff and said fixed mounting support, and a connection between the housing and said mounting support; said last mentioned connection being self-adjustable to compensate for angular and parallel misalignment between the axis of said power takeoff and the supporting surface for said mounting support.

8. A speed change transmission and prime mover unit comprising a housing, a prime mover connected to the housing so as to be supported therewith, a mounting support adapted to be fixedly mounted on a surface of a driven machinery, a transmission in the housing, a driving connection between said prime mover and said transmission, a power takeoff element journalled in the housing, a spherical support extending from the housing concentrically with said power takeoff element and being universally held in said mounting support, and a connection between the housing and said mounting support; said last mentioned connection being self-adjustable to compensate for angular and parallel misalignment between the axis of said power takeoff element and the supporting surface for said mounting support.

9. A speed change transmission and prime unit comprising, a housing, a transmission in the housing, a prime mover supported with said housing as a unit, means on said housing to drivingly connect said prime mover to said transmission, a power takeoff element journalled in said housing, a self-aligning bearing about a portion of said power takeoff element outside of said housing, a mounting support for said bearing, and an adjustable connection between said unit and said mounting support adapted to compensate for parallel and angular misalignment between the axis of said power takeoff element and the surface on which said mounting support is mounted.

10. The combination with a shaft of a driven mechanism, and a supporting surface at an end of said shaft, of a combined speed change transmission and prime mover unit for drive connection on said end of said shaft comprising, a housing, a speed change transmission in the housing, a motor supported on the housing and drivingly connected to said speed change transmission, a mounting support mounted on said supporting surface, a power takeoff element journalled in said housing and drivingly connected to said shaft, a bearing for said shaft in said mounting support, a universal self-aligning connection between said bearing and said mounting support being fulcrumed substantially about the axis of said power takeoff element, and a self-aligning connection between said housing and said mounting support self-adjustable to compensate the position of said combined unit relatively to said mounting support for angular and parallel misalignment between the axis of said power takeoff element and said supporting surface.

11. The combination with a shaft of a driven mechanism, and a supporting surface at an end of said shaft, of a combined speed change transmission and prime mover unit for drive connection on said end of said shaft comprising, a housing, a speed change transmission including a power takeoff element in the housing, a motor supported on the housing and drivingly connected to said speed change transmission, a mounting support for said combined unit mounted on said supporting surface, said power takeoff element drivingly connected to said shaft, a bearing for said shaft in said mounting support, a universal self-aligning connection between said bearing and said mounting support being fulcrumed substantially about the axis of said power takeoff element and forming a self-aligning connection between said housing and said mounting support, and said bearing providing a journal support for said power takeoff element and for said end of said shaft.

12. The combination with a shaft of a driven mechanism, and a supporting surface at an end of said shaft, of a combined speed change transmission and prime mover unit for drive connection on said end of said shaft comprising, a housing, a speed change transmission including a power take-off element in the housing, a motor supported on the housing and drivingly connected to said speed change transmission, a mounting support for said combined unit on said supporting surface, said power takeoff element drivingly connected to said shaft, a bearing for said shaft in said mounting support, a universal self-aligning connection between said bearing and said mounting support being fulcrumed substantially about the longitudinal axis of said shaft and forming a self-aligning connection between said housing and said mounting support, an adjustable reactance mechanism, said adjustable reactance mechanism including a resilient element to provide a reactance force between said driven mechanism and said housing in a direction to compensate for the position of the weight of said combined unit relatively to said universal self-aligning connection, and said reactance mechanism being self-adjustable to compensate for the position of said housing relatively to said mounting support due to any misalignment between said axis and said supporting surface.

JOHN D. RIESER.

REFERENCES CITED

The following references are of record in the file of this patent:

UNITED STATES PATENTS

| Number | Name | Date |
|---|---|---|
| 2,266,744 | Dunkelberger | Dec. 23, 1941 |

FOREIGN PATENTS

| Number | Country | Date |
|---|---|---|
| 345,054 | Great Britain | Mar. 19, 1931 |